US009176611B2

(12) United States Patent
Kim et al.

(10) Patent No.: US 9,176,611 B2
(45) Date of Patent: Nov. 3, 2015

(54) TOUCH SCREEN PANEL INCLUDING A PLURALITY OF RELAY PATTERNS AND AN AUXILIARY PATTERN

(71) Applicants: Yong-Joo Kim, Yongin (KR); Hwan-Hee Jeong, Yongin (KR)

(72) Inventors: Yong-Joo Kim, Yongin (KR); Hwan-Hee Jeong, Yongin (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 381 days.

(21) Appl. No.: 13/670,591

(22) Filed: Nov. 7, 2012

(65) Prior Publication Data
US 2013/0285939 A1     Oct. 31, 2013

(30) Foreign Application Priority Data

Apr. 27, 2012  (KR) .......................... 10-2012-0044657

(51) Int. Cl.
*G06F 3/041*    (2006.01)
*G06F 3/044*    (2006.01)
(52) U.S. Cl.
CPC ............. *G06F 3/041* (2013.01); *G06F 3/044* (2013.01); *G06F 2203/04107* (2013.01); *G06F 2203/04111* (2013.01)

(58) Field of Classification Search
USPC ...................... 345/173–178; 178/18.01–20.04
See application file for complete search history.

(56) References Cited

U.S. PATENT DOCUMENTS

| 8,736,567 | B2* | 5/2014 | Oh ................................. 345/173 |
| 2011/0050625 | A1* | 3/2011 | Kim et al. ..................... 345/174 |
| 2011/0134055 | A1* | 6/2011 | Jung et al. ..................... 345/173 |
| 2012/0098781 | A1* | 4/2012 | Kim et al. ..................... 345/174 |
| 2012/0105343 | A1* | 5/2012 | Lee et al. ...................... 345/173 |
| 2012/0182230 | A1* | 7/2012 | Wang et al. ................... 345/173 |
| 2012/0194474 | A1* | 8/2012 | Chang et al. .................. 345/174 |
| 2013/0257786 | A1* | 10/2013 | Brown et al. ................. 345/174 |

FOREIGN PATENT DOCUMENTS

| KR | 10-2010-0061993 A | 6/2010 |
| KR | 10-2012-0044500 A | 5/2012 |

* cited by examiner

*Primary Examiner* — Ryan A Lubit
(74) *Attorney, Agent, or Firm* — Lee & Morse, P.C.

(57) ABSTRACT

A touch screen panel having first sensing electrodes including a plurality of first sensing cells arranged on a substrate and a first coupling unit that electrically couples adjacent ones of the first sensing cells, and having second sensing electrodes including a plurality of second sensing cells arranged on the substrate and a second coupling unit that electrically couples adjacent ones of the second sensing cells. The second coupling unit includes a plurality of relay patterns and the relay patterns are positioned in the first sensing electrodes.

18 Claims, 3 Drawing Sheets

TOUCH SCREEN PANEL INCLUDING A PLURALITY OF RELAY PATTERNS AND AN AUXILIARY PATTERN

CROSS-REFERENCE TO RELATED APPLICATION

This application claims priority under 35 U.S.C. §119 to Korean Patent Application No. 10-2012-0044657, filed on Apr. 27, 2012, in the Korean Intellectual Property Office, the entire content of which is incorporated herein by reference.

BACKGROUND

A touch screen panel is an input device capable of selecting the indication content displayed on the screen of an image display device by a human hand or an object to input the command of a user.

SUMMARY

Embodiments may be realized by providing a touch screen panel, including a first sensing electrode including a plurality of first sensing cells arranged on a substrate and a first coupling unit for electrically coupling the adjacent first sensing cells and a second sensing electrode including a plurality of sensing cells arranged on the substrate and a second coupling unit for electrically coupling the adjacent second sensing cells. The second coupling unit includes a plurality of relay patterns positioned in the first sensing electrode.

The second coupling unit may include first auxiliary patterns coupled between the relay patterns and the second sensing cells adjacent to the relay patterns and second auxiliary patterns coupled between the relay patterns. The relay electrodes may be positioned in the first sensing electrode and may be electrically insulated from the first sensing electrode.

The relay electrodes may be separated from the first sensing electrode by a predetermined distance. The relay patterns may be formed of the same material as the first sensing cells and may be formed in the same layer. The second sensing cells may be formed of a same material as the first sensing cells and may be formed in a same layer as the first sensing cells.

The first sensing cells, the second sensing cells, and the relay patterns may be formed of a transparent conductive material. The first auxiliary patterns and the second auxiliary patterns may be formed of an opaque metal. The first auxiliary patterns and the second auxiliary patterns may be formed of at least one of Mo, Ag, Ti, Cu, and Al.

The first auxiliary patterns may contact the second sensing cells and the relay patterns through contact holes formed in the insulating layer with an insulating layer interposed between the first sensing electrodes, the second sensing cells, and the relay patterns. The second auxiliary patterns may be positioned in a same layer as the first auxiliary patterns and may contact the relay patterns through contact holes formed in the insulating layer.

The second sensing electrode may include a pair of second coupling units separated from each other with the first coupling unit interposed. The plurality of first sensing cells may be arranged in a first direction. The plurality of second sensing cells may be arranged in a second direction that intersects the first direction. The first auxiliary patterns may be formed to have a predetermined slope with respect to the second direction. The second auxiliary patterns may be formed to have a predetermined slope with respect to the second direction.

The touch screen panel may further include first position detecting lines coupled to the first sensing electrodes and second position detecting lines coupled to the second sensing electrodes. The first auxiliary patterns and the second auxiliary patterns may be formed of a same material as the first position detecting lines and the second position detecting lines.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
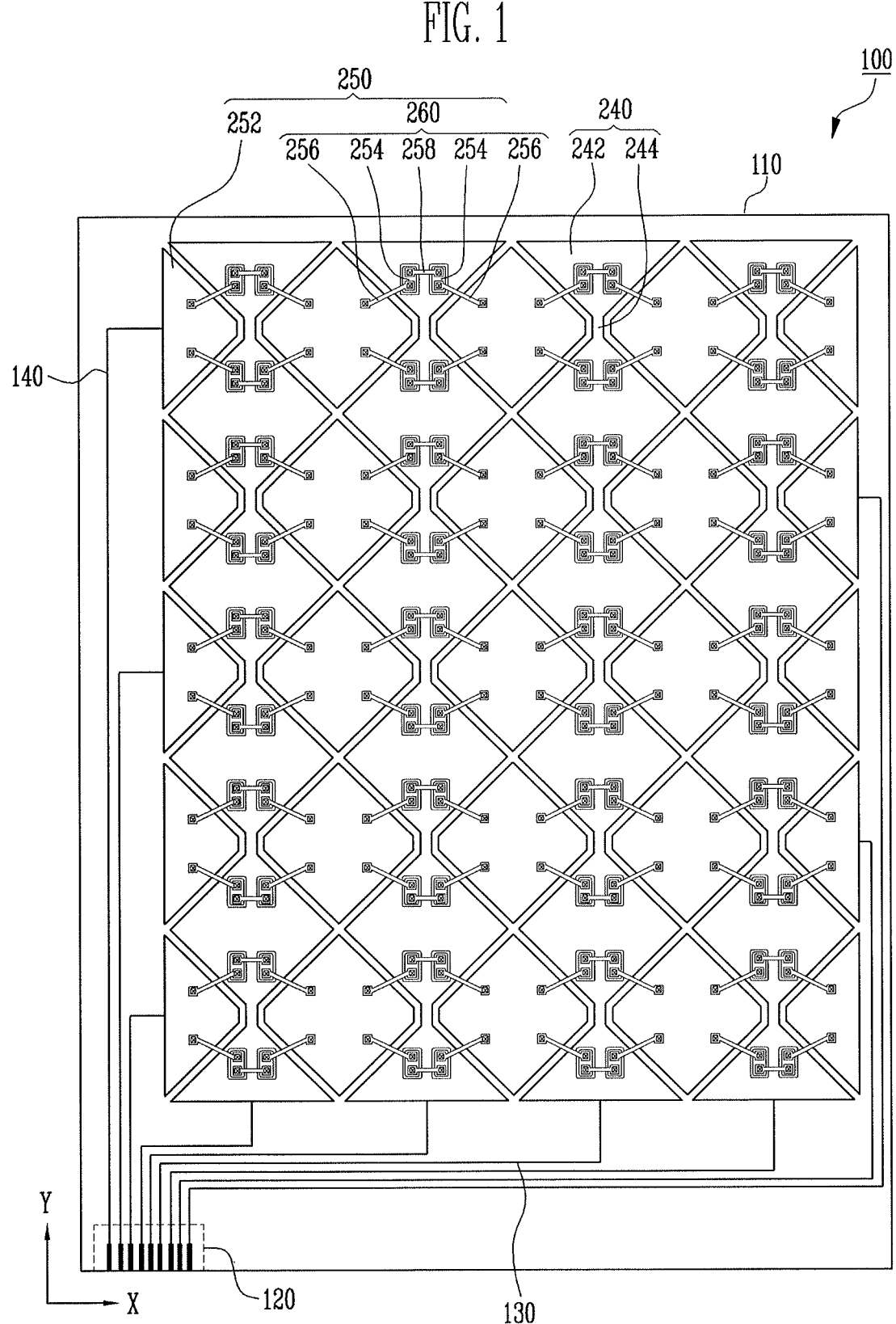
FIG. 1 is a view illustrating a touch screen panel according to an exemplary embodiment of the present invention.

Korean Patent Application No. 10-2012-0044657, filed on Apr. 27, 2012, in the Korean Intellectual Property Office, and entitled: "Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawings, when a part is coupled to another part, the part may be directly coupled to another part and the part may be electrically coupled to another part with another element interposed. In the drawings, the part that is not related to the present invention is omitted for clarity of description. The same reference numerals in different drawings represent the same element, and thus their description will be omitted.

FIG. 1 is a view illustrating a touch screen panel according to an exemplary embodiment.

Referring to FIG. 1, the touch screen panel 100 according to the exemplary embodiment includes a substrate 110, first sensing electrodes 240, and second sensing electrodes 250.

The substrate 110 on which the first sensing electrodes 240 and the second sensing electrodes 250 are positioned may be formed of a material having an insulating property such as glass, plastic, silicon, or synthetic resin and may be a flexible film.

The substrate 110 may be transparent to transmit light and may be divided into an active region in which the first sensing electrodes 240 and the second sensing electrodes 250 are arranged and a non-active region (on the outline enclosing the active region). The non-active region may include a pad unit 120 and position detecting lines 130 and 140 arranged therein. The position detecting lines 130 and 140 may be connected to the active region along different sides thereof.

An external touch driving circuit (not shown) may be electrically coupled to the pad unit 120.

Therefore, signals from the sensing electrodes 240 and 250 may be transmitted to the touch driving circuit through the position detecting lines 130 and 140 so that the touch driving circuit may grasp the touch position.

The position detecting lines 130 and 140 may be formed of a low resistance metal such as Mo, Ag, Ti, Cu, Al, and Mo/Al/Mo.

According to an exemplary embodiment, the first position detecting lines 130 may couple the first sensing electrodes 240 and the pad unit 120 to each other and the second position detecting lines 140 may couple the second sensing electrodes 250 and the pad unit 120 to each other.

In FIG. 1, the position detecting lines 130 and 140 are coupled only between the pad unit 120 and one end of each of the sensing electrodes 240 and 250. However, the position detecting lines 130 and 140 may couple the pad unit 120 and the other ends of the sensing electrodes 240 and 250 to each other.

Figure 2:
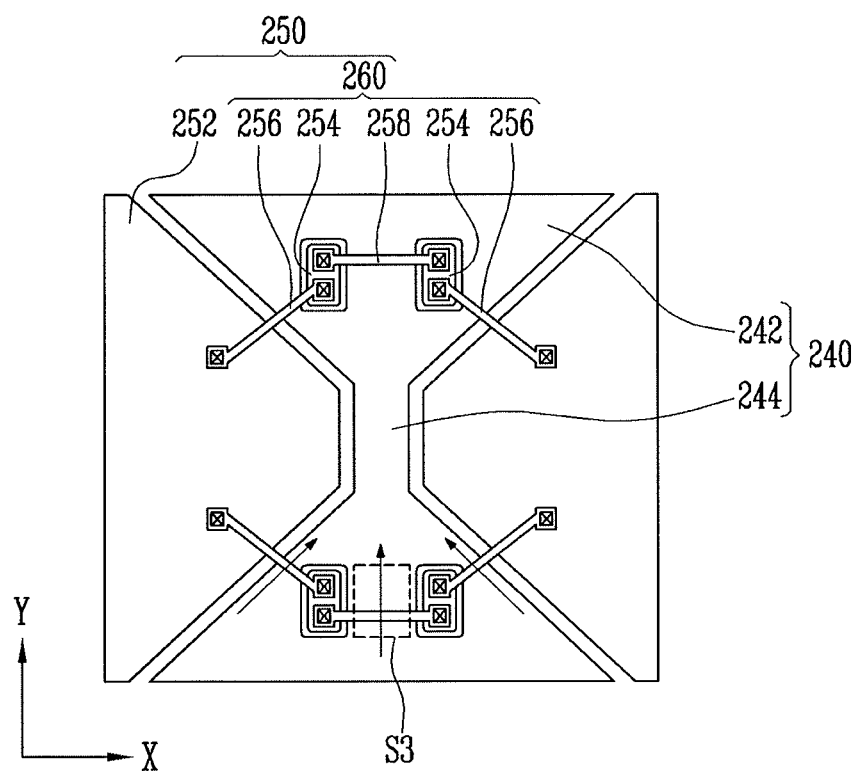
FIG. 2 is an enlarged view of a main part of the touch screen panel of FIG. 1.

FIG. 2 is an enlarged view of a main part of the touch screen panel of FIG. 1.

The plurality of first sensing electrodes 240 and the plurality of second sensing electrodes 250 may be arranged on the substrate 110 to intersect each other.

At this time, the first sensing electrodes 240 and the second sensing electrodes 250 may be directly arranged on one surface of the substrate 110. However, another element may be interposed between the first sensing electrodes 240 and the second sensing electrodes 250 and the substrate 110.

The plurality of first sensing electrodes 240 may be longitudinally formed in a first direction (for example, the Y axis direction) to be arranged in a second direction (for example, the X axis direction) that intersects the first direction. The first sensing electrode 240 may include a plurality of first sensing cells 242 arranged in the first direction and a first coupling unit 244 for electrically coupling the adjacent first sensing cells 242. As illustrated in FIG. 2, the first coupling unit 244 may be integrated with the first sensing cells 242.

The first sensing cells 242 may be formed of a transparent conductive material such as indium tin oxide (ITO) and/or indium zinc oxide (IZO). The first coupling unit 244 may be formed of the transparent conductive material such as the ITO and/or the IZO like the first sensing cells 242 and may be formed of a low resistance metal such as Mo, Ag, Ti, Cu, and Al in order to improve durability against static electricity.

The plurality of second sensing electrodes 250 may be longitudinally formed in the second direction to be arranged in the first direction. The second sensing electrodes 250 may include a plurality of second sensing cells 252 arranged in the second direction and a second coupling unit 260 for electrically coupling the adjacent second sensing cells 252.

The second sensing cells 252 may be dispersed not to overlap the first sensing electrodes 240, i.e., to be in a non-overlapping relationship in a vertical direction. The first sensing electrodes 240 and the second sensing cells 252 may have complementary shapes and may form a repeating pattern on the substrate 110.

In order to simplify processes, the second sensing cells 252 may be formed of the same material as the first sensing cells 242 and/or the first sensing electrodes 240. The second sensing cells 252 may be formed in the same layer as the first sensing cells 242 and/or the first sensing electrodes 240.

For example, the second sensing cells 252 may be formed of the transparent conductive material such as the ITO and/or IZO like the first sensing cells 242 and/or the first sensing electrodes 240.

Figure 3:
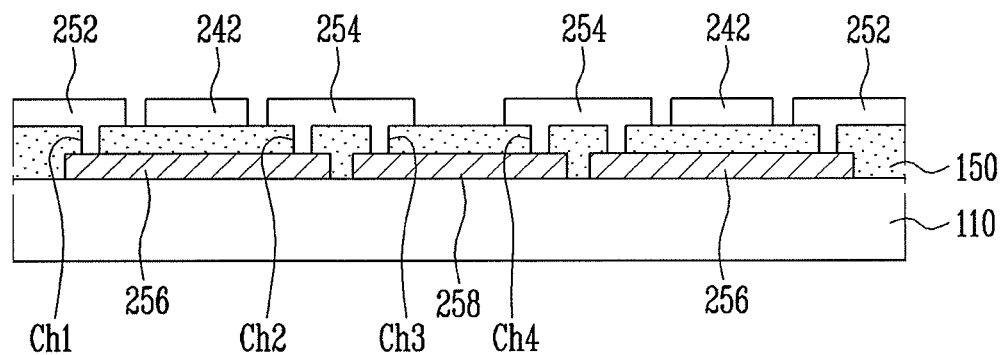
FIG. 3 is a sectional view of FIG. 2.

FIG. 3 is a sectional view of FIG. 2. In particular, FIG. 3 illustrates the section taken along the second coupling unit 260 of FIG. 2.

Referring to FIG. 2, the second coupling unit 260 includes a plurality of relay patterns 254 to electrically couple the second sensing cells 252. The second coupling unit 260 may be aligned with both the first sensing cells 242 and the second sensing cells 252, e.g., upper surfaces may be horizontally aligned so as to be coplanar.

That is, according to an exemplary embodiment, in order to reduce the possibility of and/or prevent driving defect in accordance with the inflow of static electricity, at least two relay patterns 254 may be used.

At this time, the relay patterns 254 included in the second coupling unit 260 may be positioned in the first sensing electrodes 240, e.g., may be seated within openings in the first sensing electrodes 240. For example, the relay patterns 254 may be positioned in the first sensing electrodes 240 to be electrically insulated from the first sensing electrodes 240. Therefore, the relay patterns 254 may be separated from the first sensing electrodes 240 by a predetermined distance. For example, the relay patterns 254 are positioned in the first sensing electrodes 240 in the form of islands.

In FIG. 2, the relay patterns 254 are positioned in the first sensing cells 242 of the first sensing electrodes 240. However, embodiments are not limited thereto, e.g., at least one of the relay patterns 254 may be positioned in the first coupling unit 244 since the relay patterns 254 may be positioned in any part of the first sensing electrodes 240

The relay patterns 254 may be formed of the same material as the first sensing electrodes 240 and may be formed in the same layer as the first sensing electrodes 240. For example, the relay patterns 254 may be positioned on an insulating layer 150 together with the first sensing electrodes 240 and may be formed of the transparent conductive material such as the ITO.

In this case, since the relay patterns 254 are formed by the same process as the first sensing electrodes 240, an additional mask process of forming the relay patterns 254 is not necessary so that it is possible to reduce the number of processes and process time.

In order to electrically couple the adjacent second sensing cells 252, the second sensing cells 252 and the relay patterns 254 must be electrically coupled to each other and the adjacent relay patterns 254 must be electrically coupled to each other. For example, each relay pattern may be coupled to an adjacent second sensing cell 252 by a first auxiliary pattern 256.

The second coupling unit 260 according to the exemplary embodiment may further include second auxiliary patterns 258, spaced apart from the first auxiliary patterns 256, coupled between at least two relay patterns 254. The second auxiliary patterns 258 may be between the second sensing cells 252 adjacent to the relay patterns 254 and the relay patterns 254.

The first auxiliary patterns 256 and the second auxiliary patterns 258 may be formed of an opaque metal such as at least one of Mo, Ag, Ti, Cu, and Al so as not to be easily destroyed by static electricity. The first auxiliary patterns 256 and the second auxiliary patterns 258 may be formed to have a multi-layer structure such as Mo/Al/Mo.

The auxiliary patterns 256 and 258 are formed of a low resistance metal such as Mo so that the flow of charge becomes smooth in the coupling parts between the second sensing cells 252 and that the sensing sensitivity of the second sensing electrodes 250 may be improved.

The first auxiliary patterns 256 are not parallel in the second direction (for example, the X axis direction) where the second sensing electrodes 250 are longitudinally extended but may be obliquely arranged in the second direction to have a predetermined slope.

This is because the first auxiliary patterns 256 are less visualized so that visibility may be improved in accordance with the visual characteristic of human beings in which recognition in an oblique direction deteriorates in comparison with recognition in a horizontal direction or a vertical direction.

FIG. 2 illustrates that the second auxiliary patterns 258 are arranged to be parallel in the second direction. In order to improve visibility, the second auxiliary patterns 258 may be obliquely arranged to have a predetermined slope with respect to the second direction like the first auxiliary patterns 256.

In order to simplify processes, the first auxiliary patterns 256 and the second auxiliary patterns 258 may be formed in the same process as the first position detecting lines 130 and the second position detecting lines 140.

In this case, the auxiliary patterns 256 and 258 may be formed of the same material as the position detecting lines 130 and 140 and may be formed in the same layer as the position detecting lines 130 and 140.

The first auxiliary patterns 256 may interpose the insulating layer 150 between the first sensing electrodes 240, the second sensing cells 252, and the relay patterns 254. In this case, the first auxiliary patterns 256 may contact the second sensing cells 252 and the relay patterns 254 through contact holes Ch1 and Ch2 formed in the insulating layer 150.

The second auxiliary patterns 258 may be positioned in the same layer as the first auxiliary patterns 256 and may contact the relay patterns 254 through contact holes Ch3 and Ch4 formed in the insulating layer 150.

Referring to FIG. 3, the first auxiliary patterns 256 and the second auxiliary patterns 258 are arranged on the substrate 110 and the insulating layer 150 may be formed on the first auxiliary patterns 256 and the second auxiliary patterns 258. The first sensing electrodes 240 and the first sensing cells 242 may be positioned on the insulating layer 150.

In detail, one end of the first auxiliary pattern 256 may be coupled to a second sensing cell 252 through the contact hole Ch1 and another opposing end of the first auxiliary pattern 256 may be coupled to one end of the first relay pattern 254 through the contact hole Ch2.

In addition, one end of the second auxiliary pattern 258 may be coupled to the other end of the first relay pattern 254 through the contact hole Ch3 and the other end of the second auxiliary pattern 258 may be coupled to one end of the second relay pattern 254 through the contact hole Ch4.

One end of the second first auxiliary pattern 256 may be coupled to another second sensing cell 252 through the contact hole Ch1 and the other end of the second first auxiliary pattern 256 may be connected to the other end of the second relay pattern 254 through the contact hole Ch2.

In FIG. 3, the first auxiliary patterns 256 and the second auxiliary pattern 258 are positioned in a lower part and the first sensing electrodes 240 and the second sensing cells 252 are positioned in an upper part based on the insulating layer 150. However, the opposite case may be possible.

That is, after the first sensing electrodes 240 and the second sensing cells 252 are first positioned on the substrate 110 and the insulating layer 150 is formed on the first sensing electrodes 240 and the second sensing cells 252, the first auxiliary patterns 256 and the second auxiliary pattern 258 may be positioned on the insulating layer 150.

In this case, contact holes are formed in the insulating layer 150 so that the first auxiliary patterns 256 may contact the second sensing cells 252 and the relay patterns 254 and that the second auxiliary pattern 258 may contact the relay patterns.

In FIG. 2, the case in which the second coupling unit 260 includes two relay patterns 254 is illustrated. However, more than two relay patterns 254 may be used.

The plurality of second coupling units 260 may be provided in order to secure sufficient current paths to improve touch sensitivity. For example, as illustrated in FIG. 2, the second sensing electrode 250 may include a pair of the second coupling units 260 separated from each other with the first coupling unit 244 interposed.

Since additional current paths may be secured through the above-described structure, although static electricity of a high voltage is received from the outside, it is possible to normally operate the touch screen panel. The effect of the embodiment will be described in detail with reference to FIG. 4.

Figure 4:
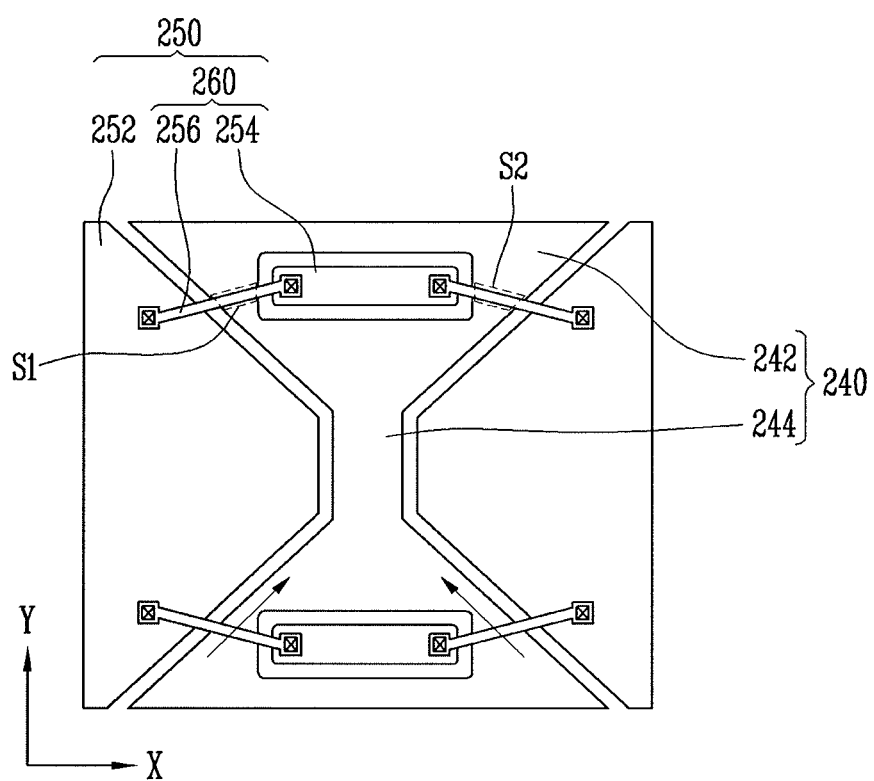
FIG. 4 is a view illustrating a case in which a second coupling unit includes a relay pattern.

FIG. 4 is a view illustrating a case in which a second coupling unit 260 includes a single relay pattern. Referring to FIG. 4, when a second coupling unit 260 includes only one relay pattern 254, the first sensing electrode 240 has two current paths.

That is, the current of the first sensing electrode 240 may flow through a region S1 and a region S2.

However, when static electricity having a high voltage is received from the outside, the regions S1 and S2 of the first sensing electrode 240 that overlap the first auxiliary patterns 256 may be destroyed by Joule heat in accordance with increase in current.

That is, since the first sensing cells 242 formed of a transparent conductive material (for example, ITO) having weaker durability than the first auxiliary patterns 256 formed of a metal are vulnerable to static electricity, when static electricity is received, the first sensing cells 242 may be destroyed together with the insulating layer interposed between the first auxiliary patterns 256.

Therefore, in the case of the touch screen panel illustrated in FIG. 4, when the regions S1 and S2 of the first sensing electrode 240 are destroyed as static electricity is received, since the flow of current is blocked, as a result, a touch signal may not be normally detected from the first sensing electrode 240. However, when the plurality of relay patterns 254 are provided, additional current paths may be created between the relay patterns 254.

That is, as illustrated in FIG. 2, the current of the first sensing electrode 240 may flow through a region S3 positioned between the relay patterns 254 together with the regions S1 and S2.

Therefore, although the region S1 and the region S2 of the first sensing electrode 240 are destroyed as static electricity is received, since current may flow through the region S3, driving defect is not generated.

By way of summation and review, a touch screen panel may be provided on the entire surface of the image display device to convert a contact position of the human hand or the object into an electrical signal. Therefore, the instruction contact selected on the touch screen panel at the contact position is received as an input signal. Since the touch screen panel may replace an additional input device coupled to the image display device to operate such as a keyboard and a mouse, the use range is gradually increasing.

Methods of realizing a touch screen panel include a resistance layer method, a photo-sensing method, and an electro-capacitive method. Among these methods, the electro-capacitive touch screen panel detects the point in which capacitance changes in accordance with the contact of the human hand or the object to grasp a contact position.

The electro-capacitive touch screen panel includes sensing electrodes having a plurality of sensing cells arranged in a specific direction and coupling units for electrically coupling the plurality of sensing cells to each other. However, the coupling units having relatively small width are often cut off by the static electricity received from the outside so that it may not be possible to detect the touch position.

In contrast, embodiments relate to a touch screen panel and to a touch screen panel capable of reducing the possibility of and/or preventing driving defect in accordance with the inflow of static electricity. For example, a touch screen panel capable of preventing driving defect in accordance with the inflow of static electricity includes a first sensing electrode and a first coupling unit, and a second sensing electrode and a second coupling unit. The second coupling unit includes a plurality of relay patterns positioned in the first sensing electrode. Further, it may be possible to provide a touch screen panel capable of reducing the possibility of and/or preventing driving defect in accordance with the inflow of static electricity by including the plurality of relay patterns to form additional current paths.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A touch screen panel, comprising:
   first sensing electrodes including a plurality of first sensing cells arranged on a substrate and a first coupling unit that electrically couples adjacent ones of the first sensing cells; and
   second sensing electrodes including a plurality of second sensing cells arranged on the substrate and a second coupling unit that electrically couples adjacent ones of the second sensing cells,
   wherein the second coupling unit includes:
   a plurality of relay patterns, the relay patterns being positioned in the first sensing electrodes,
   first auxiliary patterns coupled between the relay patterns and the second sensing cells, which second sensing cells are adjacent to the relay patterns, respectively, and
   second auxiliary patterns coupled between the relay patterns.

2. The touch screen panel as claimed in claim 1, wherein the relay patterns are positioned in the first sensing electrodes and are electrically insulated from the first sensing electrodes.

3. The touch screen panel as claimed in claim 2, wherein each of the relay patterns is separated from a corresponding one of the first sensing electrodes by a predetermined distance.

4. The touch screen panel as claimed in claim 1, wherein the relay patterns are formed of a same material as the first sensing cells and are included in a same layer as the first sensing cells.

5. The touch screen panel as claimed in claim 4, wherein the second sensing cells are formed of the same material as the first sensing cells and are arranged in the same layer as the first sensing cells.

6. The touch screen panel as claimed in claim 1, wherein the first sensing cells, the second sensing cells, and the relay patterns are formed of a transparent conductive material.

7. The touch screen panel as claimed in claim 1, wherein the first auxiliary patterns and the second auxiliary patterns are formed of an opaque metal.

8. The touch screen panel as claimed in claim 7, wherein the first auxiliary patterns and the second auxiliary patterns are formed of at least one of Mo, Ag, Ti, Cu, and Al.

9. The touch screen panel as claimed in claim 1, wherein the first auxiliary patterns contact the second sensing cells and the relay patterns through contact holes formed in an insulating layer, the insulating layer being interposed between the first sensing electrodes, the second sensing cells, and the relay patterns.

10. The touch screen panel as claimed in claim 9, wherein the second auxiliary patterns are positioned in a same layer as the first auxiliary patterns, the second auxiliary patterns contacting the relay patterns through other contact holes formed in the insulating layer.

11. The touch screen panel as claimed in claim 1, wherein:
    the first sensing cells are arranged along a first direction, and
    the second sensing cells are arranged along a second direction that intersects the first direction.

12. The touch screen panel as claimed in claim 11, wherein the first auxiliary patterns have a predetermined angle with respect to the second direction.

13. The touch screen panel as claimed in claim 11, wherein the second auxiliary patterns have a predetermined angle with respect to the second direction.

14. The touch screen panel as claimed in claim 1, further comprising:
    first position detecting lines coupled to the first sensing electrodes; and
    second position detecting lines coupled to the second sensing electrodes.

15. The touch screen panel as claimed in claim 14, wherein the first auxiliary patterns and the second auxiliary patterns are formed of a same material as the first position detecting lines and the second position detecting lines.

16. The touch screen panel as claimed in claim 1, wherein each of the second sensing electrodes includes a pair of second coupling units separated from each other with the first coupling unit interposed therebetween.

17. The touch screen panel as claimed in claim 1, wherein the plurality of relay patterns includes a pair of relay patterns in each first sensing electrode.

18. A touch screen panel comprising:
    first sensing electrodes including a plurality of first sensing cells arranged on a substrate and a first coupling unit that electrically couples adjacent ones of the first sensing cells; and
    second sensing electrodes including a plurality of second sensing cells arranged on the substrate and a second coupling unit that electrically couples adjacent ones of the second sensing cells,
    wherein the second coupling unit includes a pair of relay patterns in each first sensing electrode, and the pair of relay patterns is coupled to each other by an auxiliary pattern.

* * * * *